United States Patent
Cookman et al.

(10) Patent No.: US 10,308,352 B2
(45) Date of Patent: Jun. 4, 2019

(54) MONITORING SYSTEM FOR AIRCRAFT DRIVE WHEEL SYSTEM

(71) Applicant: Borealis Technical Limited, North Plains, OR (US)

(72) Inventors: DuWayne R. Cookman, Elbow Lake, MN (US); Scott Perkins, Kent, WA (US); Isaiah W. Cox, London (GB)

(73) Assignee: Borealis Technical Limited, Gibraltar (GI)

( * ) Notice: Subject to any disclaimer, the term of this patent is extended or adjusted under 35 U.S.C. 154(b) by 116 days.

(21) Appl. No.: 14/568,111

(22) Filed: Dec. 12, 2014

(65) Prior Publication Data

US 2016/0167803 A1  Jun. 16, 2016

(51) Int. Cl.
  *B64C 25/40* (2006.01)
  *G08G 5/06* (2006.01)
  *G05D 1/00* (2006.01)

(52) U.S. Cl.
  CPC ......... *B64C 25/405* (2013.01); *G05D 1/0083* (2013.01); *G08G 5/065* (2013.01); *Y02T 50/823* (2013.01)

(58) Field of Classification Search
  CPC ........ G01P 3/44; B60T 17/221; B60T 8/1703; B60T 8/329; F16D 66/00;
  (Continued)

(56) References Cited

U.S. PATENT DOCUMENTS 2,430,163 A   11/1947  Dever
3,563,351 A *  2/1971  Leiber ...................... B60T 8/74
                                                      188/181 A (Continued)

FOREIGN PATENT DOCUMENTS

GB   2457144 A   8/2009

OTHER PUBLICATIONS

Schier et al., Electric Wheel Hub Motor for Aircraft Application, 2011, International Journal of Renewable Energy Research, IJRER, vol. 1, No. 4, pp. 298-305.*

*Primary Examiner* — Thomas G Black
*Assistant Examiner* — Sze-Hon Kong

(57) ABSTRACT

A monitoring system is provided to ensure continued efficient reliable operation of an aircraft drive wheel drive system, preferably an aircraft drive wheel drive system driven by actuating drive system-actuated drive means, designed to drive an aircraft autonomously during ground operations. The monitoring system includes an array of sensor elements capable of obtaining desired information relating to selected drive system operating parameters and performance indicators during aircraft ground operations. The sensor elements are designed to be functionally located externally of drive system components to obtain information during aircraft ground movement under a range of operating conditions. The operating parameters and/or performance indicators to be monitored preferably include at least drive wheel speed and direction, drive means speed, drive means temperature, and drive means clutch engagement. It is contemplated that the monitoring system could be expanded to include sensors for additional drive system parameters and/or performance indicators.

9 Claims, 2 Drawing Sheets

US 10,308,352 B2
Page 2

(58) Field of Classification Search
CPC ......... F16D 2066/001; F16D 2066/003; F16D 2066/008; B60C 23/002; G01M 17/02; G01L 17/00; B64C 25/36; B64C 25/405; G08G 5/065; G05D 1/0083; G02K 7/006; Y02T 50/823

See application file for complete search history.

(56) References Cited

U.S. PATENT DOCUMENTS

| | | | | |
|---|---|---|---|---|
| 3,807,664 | A * | 4/1974 | Kelly, Jr. | B64C 25/405 180/302 |
| 3,977,631 | A | 8/1976 | Jenny | |
| 4,617,838 | A | 10/1986 | Anderson | |
| 4,979,582 | A * | 12/1990 | Forster | B60B 3/001 180/20 |
| 5,469,136 | A * | 11/1995 | Matsubara | B60C 23/0425 200/61.25 |
| 6,019,086 | A * | 2/2000 | Schneider | F02P 7/0775 123/406.18 |
| 6,305,506 | B1 * | 10/2001 | Shirai | B60T 7/042 188/136 |
| 6,313,625 | B1 * | 11/2001 | Varady | G01D 5/2013 324/173 |
| 6,581,464 | B1 * | 6/2003 | Anderson | G01P 1/026 73/493 |
| 6,615,958 | B1 * | 9/2003 | Baden | B64C 25/36 188/264 AA |
| 6,657,334 | B1 | 12/2003 | Edelson | |
| 6,838,791 | B2 | 1/2005 | Edelson | |
| 7,032,443 | B2 * | 4/2006 | Moser | B60C 23/043 73/146.5 |
| 7,116,019 | B2 | 10/2006 | Edelson | |
| 7,226,018 | B2 | 6/2007 | Sullivan | |
| 7,445,178 | B2 | 11/2008 | McCoskey et al. | |
| 7,469,858 | B2 | 12/2008 | Edelson | |
| 7,891,609 | B2 | 2/2011 | Cox | |
| 7,975,960 | B2 | 7/2011 | Cox | |
| 8,109,463 | B2 | 2/2012 | Cox | |
| 8,186,403 | B2 | 5/2012 | Sonzala et al. | |
| 8,620,493 | B2 * | 12/2013 | Hughes | G05D 1/0083 244/76 R |
| 9,013,330 | B2 * | 4/2015 | Nutaro | G08G 5/0021 340/945 |
| 9,074,891 | B2 * | 7/2015 | Nutaro | G01C 21/00 |
| 9,973,066 | B2 * | 5/2018 | Tchervenkov | H02K 16/02 |
| 2004/0011596 | A1 * | 1/2004 | Miller | B60T 17/22 188/1.11 W |
| 2005/0046558 | A1 * | 3/2005 | Buenz | B60C 23/0428 340/445 |
| 2006/0038068 | A1 * | 2/2006 | Sullivan | B60L 7/26 244/111 |
| 2006/0198074 | A1 * | 9/2006 | Hirata | H02H 3/025 361/103 |
| 2006/0208565 | A1 * | 9/2006 | O'Neill | B60T 8/325 303/152 |
| 2006/0273686 | A1 * | 12/2006 | Edelson | H02K 3/12 310/266 |
| 2007/0265739 | A1 * | 11/2007 | Griffith | G01C 23/005 701/3 |
| 2008/0023233 | A1 * | 1/2008 | Westergaard | B60S 9/215 180/9.1 |
| 2008/0033607 | A1 * | 2/2008 | Zeliff | B64D 45/0005 701/31.4 |
| 2008/0073970 | A1 * | 3/2008 | Griffith | B60T 8/1703 303/152 |
| 2008/0084331 | A1 * | 4/2008 | Pradier | B60C 23/0413 340/945 |
| 2008/0230285 | A1 * | 9/2008 | Bewley | B62D 37/00 180/8.4 |
| 2009/0066173 | A1 * | 3/2009 | Takahashi | B60L 8/003 310/48 |
| 2009/0189559 | A1 * | 7/2009 | Li | A47J 43/0705 318/434 |
| 2010/0109429 | A1 * | 5/2010 | Griffith | B60T 8/00 303/121 |
| 2010/0274607 | A1 * | 10/2010 | Carresjo | B60C 23/0416 705/7.11 |
| 2011/0155846 | A1 * | 6/2011 | Bulin | B64C 25/405 244/50 |
| 2011/0284685 | A1 * | 11/2011 | Gilleran | B64C 25/405 244/50 |
| 2011/0297786 | A1 * | 12/2011 | Sweet | B64C 25/405 244/103 R |
| 2012/0104158 | A1 * | 5/2012 | Charles | B64C 25/405 244/50 |
| 2012/0126053 | A1 * | 5/2012 | Christensen | B64C 25/405 244/50 |
| 2012/0168557 | A1 * | 7/2012 | Edelson | B64C 25/405 244/50 |
| 2012/0305345 | A1 * | 12/2012 | Ward | B60T 8/1706 188/72.4 |
| 2013/0009451 | A1 * | 1/2013 | Nishikawa | B62K 11/04 301/6.5 |
| 2013/0049549 | A1 * | 2/2013 | Folmli | B62M 6/65 310/67 A |
| 2013/0112806 | A1 * | 5/2013 | Walitzki | B64C 25/405 244/50 |
| 2013/0200209 | A1 * | 8/2013 | Goldman | B64C 25/405 244/50 |
| 2013/0200210 | A1 * | 8/2013 | Oswald | B64C 25/405 244/50 |
| 2013/0214089 | A1 * | 8/2013 | Cox | B64C 25/405 244/50 |
| 2013/0240664 | A1 * | 9/2013 | Cox | B64C 25/405 244/50 |
| 2013/0278771 | A1 * | 10/2013 | Magoun | H04N 5/33 348/148 |
| 2013/0292992 | A1 * | 11/2013 | Cahill | B64C 25/405 301/6.2 |
| 2014/0126606 | A1 * | 5/2014 | Ito | G01K 7/427 374/163 |
| 2014/0126607 | A1 * | 5/2014 | Oya | G01K 7/427 374/163 |
| 2014/0269837 | A1 * | 9/2014 | Durland | G01K 7/02 374/179 |
| 2014/0297113 | A1 * | 10/2014 | Zuckerman | H02K 5/12 701/36 |
| 2014/0316645 | A1 * | 10/2014 | Norman Rose | G01L 1/146 701/34.4 |
| 2015/0005982 | A1 * | 1/2015 | Muthukumar | B60T 1/10 701/1 |
| 2015/0137669 | A1 * | 5/2015 | Lampic | B60K 7/0007 310/67 R |
| 2015/0145703 | A1 * | 5/2015 | Martin | B64D 45/00 340/960 |
| 2015/0203194 | A1 * | 7/2015 | Griffith | B64C 25/46 701/3 |
| 2015/0210385 | A1 * | 7/2015 | Didey | B64C 25/405 244/50 |
| 2015/0219523 | A1 * | 8/2015 | White | G01M 13/00 701/3 |
| 2015/0222216 | A1 * | 8/2015 | Ogawa | B60L 3/12 318/490 |
| 2015/0303860 | A1 * | 10/2015 | Imanishi | H02K 21/14 318/473 |
| 2015/0314772 | A1 * | 11/2015 | Watanabe | B60K 6/26 477/3 |
| 2016/0039519 | A1 * | 2/2016 | Didey | B64C 25/405 244/103 S |
| 2016/0086396 | A1 * | 3/2016 | Nutaro | B64C 25/405 701/29.4 |
| 2016/0091522 | A1 * | 3/2016 | Zabulon | G01P 3/487 73/115.08 |
| 2016/0134180 | A1 * | 5/2016 | Tchervenkov | H02K 21/24 310/156.37 |
| 2016/0200428 | A1 * | 7/2016 | Morris | B60T 8/1703 244/50 |

(56) References Cited

U.S. PATENT DOCUMENTS

2016/0214707 A1\* 7/2016 Didey .................. B64C 25/405
2016/0221669 A1\* 8/2016 Didey .................. B64C 25/405
2017/0096217 A1\* 4/2017 Didey .................. B64C 25/405

\* cited by examiner

MONITORING SYSTEM FOR AIRCRAFT DRIVE WHEEL SYSTEM

TECHNICAL FIELD

The present invention relates generally to aircraft drive wheels with drive means capable of moving an aircraft on the ground independently of the aircraft engines or external vehicles and specifically to a monitoring system for an aircraft drive wheel system with a drive means actuatable to move an aircraft autonomously during ground travel without reliance on aircraft main engines or external vehicles.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become a high priority in the management of airport ground operations. The safe and efficient ground movement of a large number of aircraft simultaneously into and out of ramp and gates areas has become increasingly important. As airline fuel costs and safety concerns and regulations have increased, the airline industry is beginning to acknowledge that continuing to use an aircraft's main engines to move aircraft during ground operations is no longer the best option. The delays, costs, and other challenges to timely and efficient aircraft pushback from airport terminals associated with the use of tugs and tow vehicles makes this type of aircraft ground movement an unattractive alternative to the use of an aircraft's main engines to move an aircraft on the ground. Restricted use of an aircraft's engines on low power during arrival at or departure from a gate is an additional, although problematic, option. Not only does such engine use consume fuel, it is also burns fuel inefficiently and produces engine exhaust that contains microparticles and other products of incomplete combustion. Operating aircraft engines, moreover, are noisy, and the associated safety hazards of jet blast and engine ingestion in congested gate and ramp areas are significant concerns that cannot be overlooked.

The use of a drive means, such as a motor structure, integrally mounted with a wheel to rotate the wheel of an aircraft has been proposed. The use of such a structure should move an aircraft independently and efficiently on the ground without reliance on the aircraft's main engines. U.S. Pat. No. 2,430,163 to Dever; U.S. Pat. No. 3,977,631 to Jenny; U.S. Pat. No. 7,226,018 to Sullivan; and U.S. Pat. No. 7,445,178 to McCoskey et al describe various drive means and motors intended to drive aircraft during ground operations. None of the foregoing patents, however, suggests a monitoring system that could be used with the described motor structures or other drive means to ensure efficient, reliable aircraft ground movement without reliance on an aircraft's engines.

U.S. Pat. No. 7,469,858 to Edelson; U.S. Pat. No. 7,891,609 to Cox; U.S. Pat. No. 7,975,960 to Cox; U.S. Pat. No. 8,109,463 to Cox et al; and British Patent No. 2457144, owned in common with the present invention, describe aircraft drive systems that use electric drive motors to power aircraft wheels and move an aircraft on the ground without reliance on aircraft main engines or external vehicles. While the drive means described in these patents and applications can efficiently and reliably move an aircraft autonomously during ground operations, the use of monitoring systems in conjunction with these drive means is not suggested.

None of the foregoing art, moreover, recognizes the significant improvements in drive means operating efficiency possible when roller-type traction or other drive systems are employed to actuate the drive means described to be capable of moving aircraft on the ground or when such systems are monitored to ensure their effective reliable performance during ground operations.

Sensors and monitors for aircraft and other vehicle wheels are known in the art. U.S. Patent Publication No. US2005/0046558 to Buenz et al, for example, describes a sensing system, primarily for sensing tire pressure, that may be modified to provide and/or include wheel speed sensing. In U.S. Pat. No. 8,186,403 to Sonzala et al, bearing or brake failure in a vehicle wheel is monitored with heat sensitive pressure barriers. Sensors effective for monitoring selected operating parameters and/or performance indicators in a roller traction drive-actuated drive means in an aircraft drive wheel that moves an aircraft autonomously during ground operations are not suggested, however.

SUMMARY OF THE INVENTION

It is a primary object of the present invention, therefore, to provide a monitoring system designed to monitor selected operating parameters and performance indicators in an aircraft drive wheel with a drive system-actuated drive means that moves an aircraft autonomously during ground operations.

It is another object of the present invention to provide a monitoring system with an array of sensors positioned to obtain and transmit information relating to a range of selected operating parameters of selected components in an aircraft drive wheel with a drive system-actuated drive means that moves the aircraft autonomously during ground travel.

It is an additional object of the present invention to provide a monitoring system with an array of externally mounted sensors that monitors a plurality of aircraft drive wheel operating parameters from a location outside the harsh environment of a moving aircraft wheel.

It is a further object of the present invention to provide an aircraft drive wheel monitoring system capable of obtaining and communicating to a system controller information including at least wheel speed, wheel direction, drive means speed, and drive means temperature.

It is yet another object of the present invention to provide, in an aircraft drive wheel drive system capable of moving a aircraft autonomously during ground operations, a monitoring system that employs a system of sensors able to obtain and communicate information relating to the speed of rotating components of the drive system from a location external to the drive system.

It is yet an additional object of the present invention to provide a monitoring system for an aircraft drive wheel drive system capable of operating accurately to obtain critical system parameter information without being adversely affected by a harsh aircraft wheel environment.

It is a still further object of the present invention to provide a monitoring system for an aircraft drive wheel drive system that is designed to accept and be compatible with additional parameter sensors and monitors added to the system.

It is a still further object of the present invention, therefore, to provide a monitoring system designed to monitor selected operating parameters and performance indicators in an aircraft drive wheel with a drive system-actuated drive means that moves an aircraft autonomously during ground operations.

In accordance with the aforesaid objects, a monitoring system is provided for an aircraft drive wheel drive system driven by a drive system-actuated drive means controllable to drive an aircraft autonomously during ground operations. The monitoring system includes an array of sensor elements capable of obtaining desired selected information relating to selected drive system operating parameters and performance indicators during aircraft ground operations and communicating the information obtained to a system controller to ensure continued efficient and reliable operation of the drive system. The sensor elements are designed to be located externally of the drive system components to be monitored to ensure long term continuous operation in the harsh environment typically present in an aircraft landing gear wheel during aircraft ground movement. Operating parameters and/or performance indicators to be monitored preferably include at least drive wheel speed and direction, drive means speed, drive means temperature, and drive means clutch engagement. It is contemplated that sensors monitoring additional drive system parameters and/or indicators, for example but not limited to wheel tire pressure, could also be included in the monitoring system.

Other objects and advantages will be apparent from the following description, claims, and drawings.

DESCRIPTION OF THE INVENTION

The benefits of being able to efficiently and safely move an aircraft during ground operations autonomously and without reliance on the aircraft's main engines or external vehicles have long been recognized. Actually achieving these benefits, however, has proved challenging. Applicant's previously proposed aircraft wheel drive means have been demonstrated to effectively power drive wheels and move aircraft on the ground and, thus, can enable aircraft operators to achieve the advantages of autonomous ground movement. The present invention improves the capabilities of Applicant's original aircraft drive wheel drive system and expands the advantages possible when aircraft can be driven during ground operations by controllable onboard drive means independently of the aircraft's main engines and external ground vehicles. These advantages and improvements are achieved, in large part, by the design of an aircraft drive wheel drive system, which incorporates an actuating drive system, preferably a roller traction drive system, to actuate the drive means. In accordance with the present invention, desired important system performance operating parameters and indicators are monitored, and this information is communicated to a system controller. Appropriate action can be then taken to ensure that the aircraft drive wheel drive system is operating efficiently, effectively, and reliably to drive the aircraft autonomously during ground operations and will continue to do so.

The harsh environment found in and around aircraft landing gear wheels as a drive wheel system moves an aircraft on the ground typically poses challenges for the reliability and longevity of sensors and other monitoring equipment. The process of landing an aircraft can produce severe shocks to landing gear structures and causes vibrations in associated components when landing gear wheels contact a landing surface. High temperatures and electromagnetic interference can also adversely affect the function and/or accuracy of sensors and monitors. The accurate monitoring of aircraft drive wheel drive system operation must overcome these challenges, and the present invention provides a design that accomplishes this.

The present monitoring system is intended to operate primarily in connection with a preferred aircraft drive wheel drive system that includes a roller traction drive-actuated drive means capable of moving an aircraft autonomously on the ground without reliance on the aircraft's main engines or external vehicles. The present monitoring system ensures that the drive system is operating as efficiently, effectively, and reliably as possible to drive the aircraft during ground operations and is described in connection with this type of system. It is contemplated, however, that the present monitoring system will also be useful with other aircraft drive wheel drive systems, whether driven by roller traction drives, conventional gearing, or some other drive means actuating system.

Figure 1:
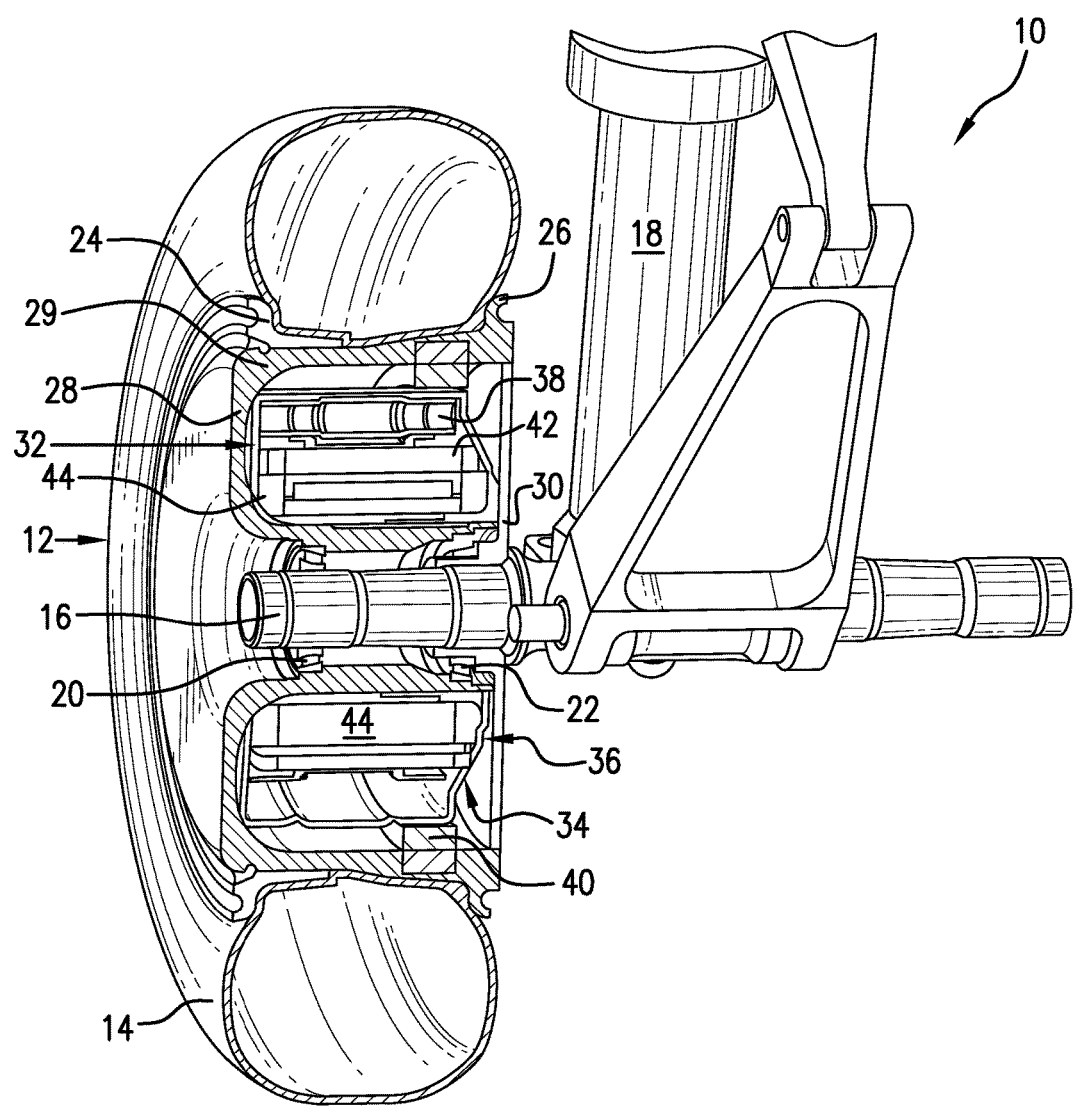
FIG. 1 is a cross-sectional perspective schematic view of a portion of an aircraft landing gear and a landing gear drive wheel showing the monitoring system of the present invention mounted on a drive system-actuated drive means capable of driving the aircraft autonomously during ground operations.

Referring to the drawings, FIG. 1 shows, in cross-sectional perspective view, a portion of an aircraft landing gear 10 and a landing gear wheel 12 with an aircraft drive wheel drive system mounted within the landing gear wheel. Only one landing gear wheel is shown in detail. It is contemplated, however, that one or more nose landing gear wheels, one or more main landing gear wheels, or a combination of nose and main landing gear wheels could be equipped with drive wheel drive systems and monitoring systems for such drive wheel drive systems as described herein. In one possible arrangement, for example, equipping both wheels in a two-wheel nose landing gear with an aircraft drive wheel system and the present monitoring system provides the capability not only to ensure that the aircraft is moved effectively and reliably on the ground, but also to monitor each wheel's drive system so that the drive means of each wheel can be selectively actuated to differentially steer and brake the aircraft.

A tire 14 is shown mounted on the wheel 12. The wheel 12 and tire 14 are rotatably mounted on an axle 16 attached to the landing gear 10. The landing gear 10 includes a central piston 18 and other standard landing gear structures (not numbered) typically found in an aircraft nose or main wheel landing gear. The wheel 12 is rotatably supported on the axle 16 by support structures, such as the bearing arrangements 20 and 22 shown adjacent to the axle 16. Other suitable support structures or bearings could also be used for this purpose. The wheel 12 preferably has the two part configuration shown in FIG. 1, although a range of other wheel designs could also be employed.

Removal and remounting of the tire 12 is facilitated by providing a demountable tire flange 24 on an outboard side of the wheel 12 that can be removed when necessary. A stationary tire flange 26 is provided to hold an opposite side of the tire 14. The stationary tire flange is integrally formed with an upper portion 29 of a substantially "C"-shaped outboard wheel wall section 28 that forms most of the wheel. A smaller inboard wheel wall section 30 connects to the outboard wheel section 28 to define a maximum space or volume within the wheel 12 where the drive wheel drive system of the present invention can be mounted. To provide a clearer view of the main components of the present aircraft drive wheel system, elements, such as, for example, the tire valve stem, are not shown.

Figure 2:
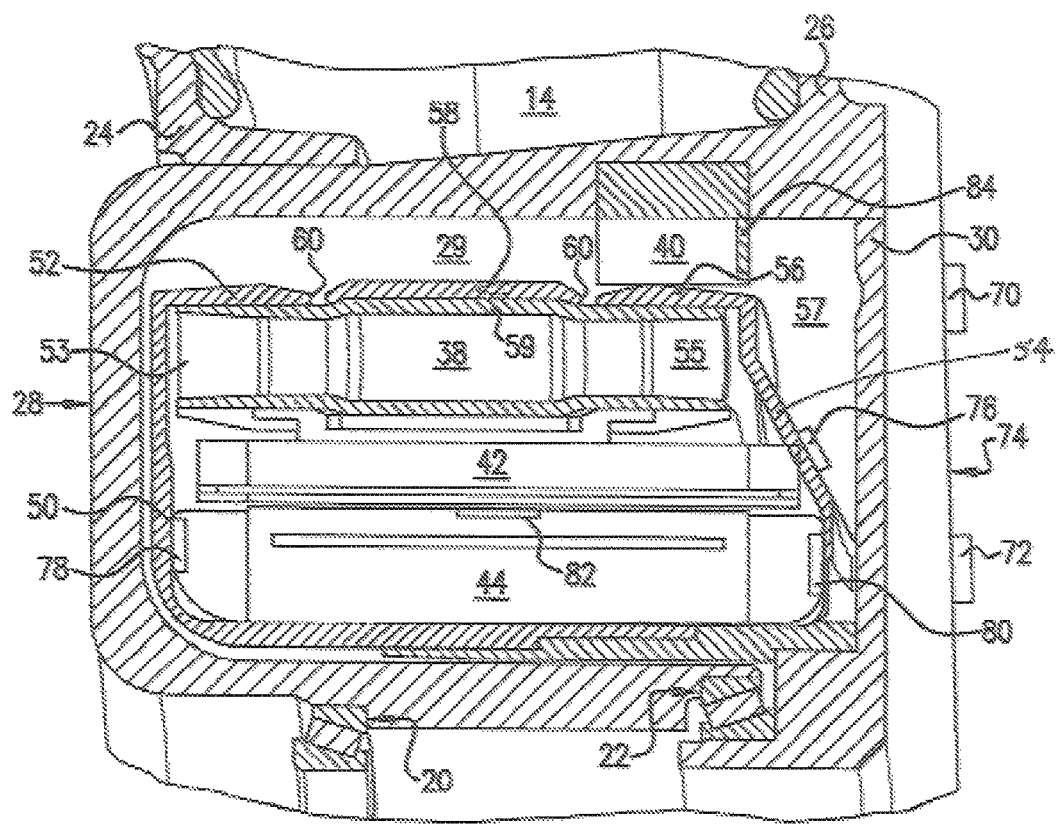
FIG. 2 is a diagrammatic view of the monitoring system of the present invention showing preferred locations of monitors and/or sensors relative to a drive means, actuating drive system, and clutch assembly within a space in an aircraft wheel defined to hold these drive system components.

A preferred configuration and arrangement of components of the drive wheel drive system 32 of the present invention is shown in FIGS. 1 and 2. Other functionally equivalent arrangements and configurations could also be employed and are contemplated to be within the scope of the present invention. In the preferred configuration shown, the components of the drive system 32 are enclosed within a drive system housing 34 that is shaped to fit substantially completely within the space created by the arrangement of the respective outboard and inboard wall sections 28 and 30 of the wheel 12. The main elements of the preferred drive wheel drive system include a drive means 36, an actuating drive system 38, and a clutch assembly 40, preferably positioned as shown in FIG. 1.

Although a roller traction drive system is the preferred actuating drive system for the drive means 36, the present monitoring system is intended to work with any type of drive means actuator or drive means actuating system, including, but not limited to, any type of conventional gearing structures and/or similar structures or arrangements which a roller traction drive is designed to replace.

In a preferred drive system 32 arrangement, the components of the drive means 36 and the actuating drive system 38 are not centered within the wheel space, but are positioned within the system housing 34 so that the outboard edges of these structures are in substantially parallel alignment with the outboard wheel wall 28. Consequently, the preferred system housing 34 has the asymmetrical configuration shown, which can provide space within the wheel for components of the present monitoring system and/or other drive system elements.

A preferred drive means 36 includes a rotating element, such as a rotor 42, and a stationary element, such as a stator 44. The rotor 42 is preferably located externally of the stator 44, as shown, but other drive means component arrangements could also be used. For example, the positions of the rotor 42 and stator 44 could be reversed so that the rotor is internal to the stator.

One type of drive means 36 preferred for use with the aircraft drive wheel drive system of the present invention is an electric motor assembly that is capable of operating at high speed and could be any one of a number of suitable designs. An example of a type of drive means with which the present monitoring system could be used effectively is an inside-out electric motor in which the rotor can be internal to or external to the stator, such as that shown and described in U.S. Patent Application Publication No. 2006/0273686, the disclosure of which is incorporated herein by reference. A range of motor designs capable of high torque operation across a desired speed range that can move an aircraft wheel and function as described herein may also be suitable drive means in the present drive wheel system. A high phase order electric motor of the kind described in, for example, U.S. Pat. Nos. 6,657,334; 6,838,791; 7,116,019; and 7,469,858, the disclosures of the aforementioned patents are incorporated herein by reference, can be effectively used as a drive means 36. An example of a suitable drive means 36 is a high phase order induction motor with a top tangential speed of about 15,000 linear feet per minute and a maximum rotor speed of about 7200 rpm, although drive means capable of a wide range of such speeds would be used with the present drive wheel system. Other drive means, including hydraulic and/or pneumatic drive means, are also contemplated to be within the scope of the drive means that could be effectively monitored with the present monitoring system.

The system housing 34 is specifically designed to operatively enclose the drive means 36 and actuating drive system 38, as well as to operatively support the clutch assembly 40 as it is controlled to engage and disengage the roller traction drive. FIG. 2 shows these structures in greater detail than they appear in FIG. 1. The system housing 34 completely encloses the aircraft drive wheel system components and supports them completely within the space available in an aircraft drive wheel. Although other functionally equivalent housing arrangements are encompassed within the scope of the present invention, the preferred system housing 34 shown in FIG. 2 is formed in sections. The drive system housing 34 includes an outboard section 50 that extends from the stationary element 44 of the drive means substantially parallel to the wheel wall 28 toward the wheel section 29 to form an outboard lip 52 that contacts and wraps around an outboard end 53 of the actuating drive 38. An inboard section 54 of the motor housing 34 is angled from the stationary element 44 toward the horizontal upper wheel section 29 to form an inboard lip 56 that contacts and wraps around an inboard end 55 of the actuating drive system 38. The inboard lip 56 is shown to be interposed between an outer surface of the actuating drive inboard end 55 and the clutch assembly 40, although other structural arrangements may be required to accommodate different clutch assemblies. A circumferential central system housing section 58 is disposed between the housing outboard lip 52 and inboard lip 56 and preferably contacts an output surface 59 of the actuating drive system, which is preferably a roller traction drive system.

The actuating drive system 38, which is positioned between the drive means 36 and the system housing sections 52, 56, and 58, is not shown in the lower part of the wheel 12 in FIG. 1, providing a clearer view of the preferred three-part system housing. It will be noted that circumferential gaps 60 are provided between the central circumferential section 58 and the outboard and inboard lip portions 52 and 56 of the system housing. These gaps can accommodate expansion of the materials from which the housing sections are formed during operation of the drive system to move the aircraft on the ground.

As discussed above, the inboard section 54 of the system housing is angled to correspond to the asymmetric shape of the nonparallel inboard edges of the drive means elements 42 and 44 and the actuating drive system 38, which provides an inboard recess 57 between the system housing wall 54 and the inboard wheel wall 30. The recess 57 may be used, for example, to accommodate clutch assembly components. The inboard system housing section 54 and recess 57 could also direct and receive wiring (not shown) from the drive means elements, sensors, and/or other components that must be attached to wiring. This wiring may be a wire harness or other convenient wiring arrangement that ultimately connects the drive wheel components to the aircraft electrical system and/or a source of electrical power.

The preferred actuating drive system 38 is a roller traction drive system that performs essentially the same functions that would be performed by gearing or a gear system. The replacement of gearing by a roller traction drive system in an aircraft drive wheel drive system presents many advantages. A roller traction drive system designed to actuate a drive means capable of moving a commercial sized aircraft on the ground not only has a low profile and is light weight, but also provides the high torque and high speed change ratio required to optimally operate the drive means to move an aircraft on the ground. Unlike a gear system, a roller traction drive system has substantially zero backlash and can be made of dry running components that do not require lubrication. Planetary and other gear systems are capable of only limited gear ratios, while an infinite gear ratio is possible with a preferred roller traction drive system. A roller traction drive system preferred for the present aircraft drive wheel system is, in addition, self-energizing. Other advantages of integrating a roller traction drive system with an aircraft drive wheel drive means to drive an aircraft wheel and move an aircraft on the ground can also be realized.

Although a roller traction drive system is the preferred actuating drive system, an actuating drive system formed of conventional gears and/or gearing systems of any type suitable for use in actuating a drive means to power an aircraft drive wheel and move an aircraft autonomously during ground operations could also be used to actuate the drive means. Actuating drive systems including all types of gearing, gear systems, and the like are also contemplated to be within the scope of the present invention.

The monitoring system of the present invention is designed to ensure the efficient, effective, and reliable operation of the aircraft drive wheel drive system described above. An array of sensors is provided to obtain information about selected operating parameters and performance indicators relating to the operation of the drive wheel drive system, as well as components of the drive wheel drive system, in real time to ensure that the system is functioning as intended to move an aircraft during ground operations. The information obtained may be communicated to a system controller (not shown), and/or to another destination, so that appropriate action can be taken in response to ensure the efficient and reliable continued ground movement of an aircraft. A preferred array of sensors may include, for example, without limitation, sensors designed to sense and transmit information relating to the actual and/or absolute speed of the drive wheel 12 as it rotates about axle 16 and moves an aircraft on the ground, the direction in which the drive wheel 12 is moving, the speed of the drive means rotating element 42, and the temperature of the drive means 32 during operation. The specific design of the sensors selected for these monitoring functions may depend, at least in part, on the size of the motor or other drive means incorporated into the drive system and its output path. A sensor that monitors clutch engagement and/or disengagement is also preferably provided. Additional sensors, such as, for example without limitation, a tire pressure sensor, may also be provided and are included within the scope of the present monitoring system. It is anticipated that the range and type of monitors and/or sensors will be expanded as required to ensure optimal information collection and processing as needed for the efficient operation of an aircraft drive wheel drive system to move an aircraft autonomously on the ground.

The specific positions, numbers, and types of sensors can vary. For a drive wheel drive system as described above, one preferred array of sensors includes wheel speed and direction sensors, drive means speed sensors, drive means temperature sensors, and clutch engagement sensors. Each drive wheel on an aircraft that has a drive system is preferably provided with a sensor array that includes at least these types of sensors. As noted above, other kinds of sensors could also be included in the sensor array, if desired. The sensors shown in the drawings are not drawn to scale, and the sensor locations shown are intended to illustrate schematically possible sensor locations. In practice, the specific locations of these sensors may vary from the positions shown. The number and specific locations of sensors in the present monitoring system will be chosen to provide and communicate the most accurate information possible relating to the operating parameters and/or performance indicators selected to ensure continued efficient and reliable ground operation of an aircraft.

FIG. 2 shows the preferred array of sensors described above. The present monitoring system proposes including at least two wheel speed sensors for each aircraft drive wheel. These sensors 70 and 72 (FIG. 2) are preferably staggered and mounted external to the wheel 12 and the inboard wheel wall section 30 so that pulses from a toothed edge (not shown) on a spinning plate 74 that is attached directly to the wheel can be detected. This type of sensor is known as a "look in" or "peek in" sensor since it can obtain the required information without being directly present within the wheel environment, which contributes to the accuracy and longevity of the sensors, even those sensors capable of operating in the harsh environment of an aircraft landing gear wheel. It is preferred that the wheel sensors 70, 72 be capable of monitoring both wheel speed and direction of travel. Lead edge detection logic within a system controller (not shown) for the drive wheel drive system may be used to determine wheel direction, although other suitable software may also be employed for this purpose. Preferred for use as wheel speed and direction sensors are proximity sensors from the 21FW series available from Honeywell. These Hall effect sensors are single channel sensors that have been demonstrated to be very reliable in harsh conditions, such as those found in an aircraft landing gear wheel environment. They have a small profile, which enables them to fit within the limited space available in an aircraft drive wheel, and their ability to resist shock, vibration, temperature, and electromagnetic interference at levels typically encountered in an aircraft landing gear wheel that is not a drive wheel makes them suitable for the present drive wheel drive system monitoring system.

The present monitoring system for each drive wheel preferably also includes in the sensor array a similar proximity sensor 76, mounted on inboard section 54 of the drive system housing 34 internally of the inboard wheel wall section 30, capable of determining the speed of the drive means rotor 42 or other drive means rotating element, preferably by detecting pulses from a toothed edge of a spinning plate (not shown) attached to a drive means rotating element. Other, equivalent, structures may also be used to provide a measure of drive means speed from a location outside the drive means. At least one sensor per wheel is generally sufficient to provide the desired drive means speed information, but additional sensors could be included in the sensor array. A "look in" sensor from the Honeywell 21FW series of sensors is also preferred for this purpose. Any wiring for sensor 76 and/or other sensors may be combined with a wire harness (not shown) used to connect drive means electrical components, including the stator or stationary element 44 and rotor or rotating element 42, to the aircraft electrical system. The relative speeds of the wheel 12 and the drive means 34 can be determined by system software from the sensed and measured absolute speeds.

Maintaining the temperature of the drive means rotating element 42 and stationary element 44 at a desired optimal temperature level for efficient drive means operation to effectively power an aircraft drive wheel to move an aircraft autonomously on the ground is critical. The present monitoring system includes temperature or thermal sensors to determine whether the temperature of drive means components, particularly coils on the stationary or stator element 44, are within acceptable operational limits. It is preferred that at least three temperature sensors, represented by sensors 78, 80, and 82, are provided for each drive wheel drive means. Temperature sensor 78 is shown mounted interiorly of the drive system housing 34 outboard section 50, temperature sensor 80 is shown mounted interiorly of the drive system housing 34 inboard section 54, and temperature sensor 82 is shown mounted on the stator element 44 in FIG. 2. The actual numbers, sizes, and locations of such temperature sensors will be determined by many factors, including the specific drive means selected for use with the drive system.

The drive means temperature is preferably monitored to ensure that it does not increase more than 1° C. per second at full power. When the temperature sensors indicate that a predetermined maximum drive means temperature limit has been reached, the present monitoring system will communicate that information to a system controller (not shown), and power to the drive means will be reduced or cut off, as appropriate under the specific circumstances. This could occur at a temperature in the range of about 180° C. for one preferred type of drive means. Other drive means may tolerate different temperature limits. One type of temperature sensor preferred for this function is a resistance temperature detector Model 0118MH flexible surface temperature sensor available from Goodrich Corporation, although other temperature or thermal sensors suitable for use in an aircraft drive wheel drive means environment could also be used.

The present monitoring system sensor array further includes an additional sensor 84, which is provided in a suitable location to monitor whether the clutch assembly 40 is engaged or disengaged. FIG. 2 shows clutch sensor 84 on the clutch assembly 40. The specific location and type of sensor will depend on the type of clutch assembly 40 that is selected for a specific drive means actuator. In operation, a clutch assembly for an aircraft drive wheel drive system 32, such as that shown and described herein, should be sensed to be fully engaged and capable of driving an aircraft wheel only when the aircraft is moving or ready to move on a ground surface. When a clutch assembly, such as clutch assembly 40, is employed to engage a drive means actuator 38, such as a roller traction drive, to actuate a drive means 36 to drive an aircraft wheel, monitoring whether the clutch assembly 40 is disengaged or engaged provides information about the operational readiness of the drive wheel drive system to drive the aircraft. The clutch assembly should be shown by the monitoring system clutch sensor 84 to be engaged only when it is appropriate to drive the aircraft on the ground. If the sensor 84 indicates that the clutch assembly 40 is not engaged after the aircraft has touched down, appropriate action can be taken to engage the clutch so that the roller traction or other actuating drive is activated to actuate the drive means so that the aircraft can be moved on the ground by the drive wheel drive system. Further, if the sensor 84 indicates that the clutch assembly 40 is engaged after the aircraft has taken off, appropriate action can be taken to disengage the clutch assembly and, thus, to deactivate the roller traction or other actuating drive so that it cannot actuate the drive means, and the drive wheel drive system will not be operational while the aircraft is in flight. It is contemplated that other sensor systems, such as, for example, weight-on-wheels sensors, could be adapted to work in connection with the clutch sensor of the present monitoring system to ensure that an aircraft's wheel drive system clutch is engaged and the drive system is operational only when the aircraft is ready to begin ground movement or is actually moving on the ground. The clutch assembly and, therefore, the drive system should be disengaged at all other times.

As noted above, the present monitoring system has been designed so that it can accommodate sensors for additional operating parameters or performance indicators beyond those described. Such additional sensors could include, for example, tire pressure sensors. The sensor array of the present monitoring system could be expanded to include any other sensors useful to monitor any aircraft drive wheel drive system operating parameters and/or performance indicators under all kinds of operating conditions.

While the present invention has been described with respect to preferred embodiments, this is not intended to be limiting, and other arrangements and structures that perform the required functions are contemplated to be within the scope of the present invention.

INDUSTRIAL APPLICABILITY

The monitoring system for an aircraft drive wheel drive system of the present invention will find its primary applicability where it is desired to realize the benefits of moving an aircraft very efficiently on the ground without reliance on the aircraft's main engines or external ground vehicles and to provide maximum control required over the operation of this aircraft wheel drive system under a range of operating conditions to ensure the efficient, reliable operation of the system.

The invention claimed is:

1. A monitoring system for an aircraft drive wheel system capable of operating accurately to obtain critical system parameter information without being adversely affected by a harsh aircraft landing gear wheel environment as the aircraft is driven autonomously during ground travel by the drive system without reliance on aircraft main engines or external vehicles, comprising:

a. an aircraft equipped with one or more landing gear wheel-mounted drive systems mounted and supported for rotation about landing gear axles completely within a drive system housing shaped to fit completely within a space defined by and inwardly of inboard and outboard wheel wall sections of said one or more landing gear wheels and operable to drive the aircraft during ground travel without reliance on aircraft main engines or external vehicles;

b. components of each said drive system comprising at least an actuating roller traction drive system in actuating contact with an electric drive motor assembly operatively supported and enclosed completely within said drive system housing and a clutch assembly operatively positioned within said defined space in engaging and disengaging contact with said actuating roller traction drive system, wherein said electric drive motor assembly comprises a stator element positioned in a portion of said drive system housing adjacent to said axles and a rotor element positioned outwardly of said stator element and extending toward said actuating roller traction drive system; and c. an array of a plurality of sensors positioned in selected monitoring locations internally of said drive system housing, externally of said drive system housing, and externally of said inboard wheel wall section to obtain in real time critical system parameter information comprising at least actual speed, absolute speed, and a direction of travel of said one or more landing gear wheels, speed of said rotor element, temperature of said electric drive motor assembly, and engagement of said clutch assembly while said aircraft is driven autonomously on the ground by the one or more landing gear wheel-mounted drive systems, wherein said array of said plurality of sensors for each drive system comprises at least two wheel speed sensors mounted in staggered positions externally of said inboard wheel wall section, a rotor element speed sensor mounted on an external surface of said drive system housing within said defined space, and three temperature sensors mounted on internal surfaces within said drive system housing and on said stator element.

2. A method for obtaining and monitoring critical landing gear wheel-mounted drive system operating parameters and performance indicators within an aircraft landing gear wheel environment in real time during ground travel of an aircraft driven autonomously with the landing gear wheel-mounted drive systems, comprising:
   a. equipping an aircraft for autonomous ground travel with drive systems operative to drive the aircraft during ground travel without reliance on aircraft main engines or external vehicles mounted on axles completely within spaces defined by inboard wheel wall sections and outboard wheel wall sections of each one of a pair of nose landing gear drive wheels, and providing a multiple part housing shaped to fit completely within the space defined by the inboard wheel wall section and the outboard wheel wall section of each nose landing gear wheel, wherein corresponding inboard and outboard sections of the multiple part housing are spaced inwardly from the inboard and outboard wheel wall sections;
   b. operatively supporting and enclosing components of each drive system completely within the multiple part housing, the components of each drive system comprising a roller traction drive system in actuating contact with an electric drive motor assembly having a stator element positioned toward an axle and a rotor element positioned outwardly of the stator element to extend toward the roller traction drive system, and operatively supporting outwardly of the multiple part housing and within the defined space a clutch assembly positioned to engage and disengage the roller traction drive system into and out of actuation with the electric drive motor assembly;
   c. providing for each drive system an array of sensors selected and positioned to obtain directly or indirectly and to monitor in real time operating parameters and performance indicators of the components of the drive system, wherein the array of sensors comprises at least two wheel speed sensors capable of determining both wheel speed and direction of each nose landing gear wheel, at least one sensor capable of determining speed of each electric drive motor assembly rotor element, at least three temperature sensors capable of determining temperature of the components of each drive system, and a clutch sensor capable of determining engagement of the roller traction drive system by the clutch assembly, and the array of sensors is functionally located to provide and communicate the most accurate information relating to the operating parameters and performance indicators of the components of each drive system; and
   d. in real time as the aircraft is driven during ground travel by the nose landing gear drive wheel-mounted drive systems, determining the operating parameters and performance indicators of the components of each drive system with the array of sensors, communicating the determined operating parameters and performance indicators of the components of the drive system, and continuing to drive the aircraft with the nose landing gear drive wheel-mounted drive systems as indicated by the communicated operating parameters and performance indicators of the components of each drive system.

3. The method of claim 2, further comprising when the clutch sensor determines engagement of the roller traction drive system by the clutch assembly, disengaging the clutch assembly from the roller traction drive system so that the aircraft cannot be driven by the nose landing gear wheel-mounted drive systems.

4. The method of claim 2, further comprising providing a nose landing gear drive wheel direction sensor in the array of sensors comprising the at least two wheel speed sensors, locating the nose landing gear drive wheel direction sensor to detect nose landing gear drive wheel direction, and communicating information obtained from the landing gear drive wheel direction sensor in real time as the aircraft is driven with the landing gear wheel-mounted drive systems during ground travel.

5. The method of claim 2, further comprising determining the temperature of the stator element with the at least three temperature sensors, communicating and monitoring the determined temperature of the stator element in real time, and continuing to drive the aircraft with the nose landing gear wheel-mounted drive systems when the determined temperature of the stator element does not increase more than 1° C. per second with the electric drive motor assembly is operating at full power while the aircraft is driven during ground travel with the electric drive motor assembly.

6. A monitoring system for real time determination of critical aircraft nose landing gear wheel-mounted electric drive system operating parameters and performance indicators selected operating parameters during autonomous ground travel of an aircraft driven by nose landing gear wheel-mounted electric drive systems without reliance on aircraft main engines or external vehicles, comprising
   a. an aircraft equipped for autonomous ground travel without reliance on aircraft main engines or external vehicles with an electric drive system mounted on axles completely within spaces defined by inboard wheel wall sections and outboard wheel wall sections of each one of a pair of nose landing gear drive wheels on said aircraft;
   b. a multiple part housing shaped to fit completely within said space defined by said inboard wheel wall section and said outboard wheel wall section of each said nose landing gear drive wheel, wherein corresponding inboard and outboard sections of said multiple part housing are spaced inwardly from said inboard and outboard wheel wall sections;
   c. each said electric drive system comprises an electric drive motor assembly comprising a rotor element positioned outwardly of a stator element and a roller traction drive system in actuating contact with said electric drive motor assembly supported completely within said multiple part housing, and further comprises a clutch assembly positioned within said defined space to engage or disengage the roller traction drive system; and d. an array of sensors selected and positioned to obtain directly or indirectly and to monitor in real time operating parameters and performance indicators of said electric drive system, said array of sensors comprising at least two wheel speed sensors positioned to determine both wheel speed and direction of each nose landing gear wheel, at least one sensor positioned to determine speed of each electric drive motor assembly rotor element, at least three temperature sensors positioned to determine temperature of said electric drive system, and a clutch sensor positioned to determine engagement of the roller traction drive assembly by the clutch assembly, wherein the array of sensors is functionally located relative to said defined space and said multiple part housing to obtain and communicate directly or indirectly information relating to said operating parameters and performance indicators of said electric drive system.

7. The monitoring system of claim 6, wherein said at least two wheel speed sensors comprise proximity sensors positioned to detect wheel speed and rotor speed indirectly.

8. The monitoring system of claim 6, wherein said at least three temperature sensors are positioned to obtain a real time operating temperature of said stator element.

9. The monitoring system of claim 6, wherein said at least two wheel speed sensors comprise look-in or peek-in types of sensors.

* * * * *